United States Patent
Kwon et al.

(10) Patent No.: US 11,316,161 B2
(45) Date of Patent: Apr. 26, 2022

(54) LITHIUM SECONDARY BATTERY

(71) Applicant: Samsung SDI Co., Ltd., Yongin-si (KR)

(72) Inventors: Tae-Ho Kwon, Yongin-si (KR); Jinman Jeoung, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 95 days.

(21) Appl. No.: 16/337,626

(22) PCT Filed: Apr. 4, 2017

(86) PCT No.: PCT/KR2017/003688
§ 371 (c)(1),
(2) Date: Mar. 28, 2019

(87) PCT Pub. No.: WO2018/074684
PCT Pub. Date: Apr. 26, 2018

(65) Prior Publication Data
US 2020/0036007 A1   Jan. 30, 2020

(30) Foreign Application Priority Data

Oct. 18, 2016 (KR) .................. 10-2016-0135148

(51) Int. Cl.
*H01M 4/587* (2010.01)
*H01M 4/04* (2006.01)
(Continued)

(52) U.S. Cl.
CPC ......... *H01M 4/587* (2013.01); *H01M 4/0445* (2013.01); *H01M 4/133* (2013.01);
(Continued)

(58) Field of Classification Search
None
See application file for complete search history.

(56) References Cited

U.S. PATENT DOCUMENTS

| | | | |
|---|---|---|---|
| 2006/0216612 A1 | 9/2006 | Jambunathan et al. | |
| 2009/0146613 A1* | 6/2009 | Yang | H02J 7/0086 320/139 |

(Continued)

FOREIGN PATENT DOCUMENTS

| | | |
|---|---|---|
| CN | 1866603 A | 11/2006 |
| CN | 103378349 A | 10/2013 |

(Continued)

OTHER PUBLICATIONS

Extended European Search Report for corresponding European Patent Application No. 17861364.2, dated Jul. 7, 2020, 8 pages.

(Continued)

*Primary Examiner* — Jeremiah R Smith
(74) *Attorney, Agent, or Firm* — Lewis Roca Rothgerber Christie LLP

(57) ABSTRACT

The present invention relates to a lithium secondary battery, comprising: a negative electrode comprising a negative electrode active material layer comprising a soft carbon negative electrode active material and a byproduct having an average particle size (D50) of 10 to 70 nm; a positive electrode comprising a positive electrode active material; and an electrolyte.

6 Claims, 7 Drawing Sheets

(51) Int. Cl.
  *H01M 4/133* (2010.01)
  *H01M 10/0525* (2010.01)
  *H01M 4/1397* (2010.01)
  *H01M 4/02* (2006.01)
  *H01M 4/1393* (2010.01)
  *H01M 4/58* (2010.01)
  *H01M 4/583* (2010.01)

(52) U.S. Cl.
  CPC ..... *H01M 4/1397* (2013.01); *H01M 10/0525* (2013.01); *H01M 4/1393* (2013.01); *H01M 4/582* (2013.01); *H01M 4/5805* (2013.01); *H01M 4/5835* (2013.01); *H01M 2004/021* (2013.01); *H01M 2004/027* (2013.01)

(56) References Cited

U.S. PATENT DOCUMENTS

| | | | |
|---|---|---|---|
| 2012/0040249 A1 | 2/2012 | Sheem et al. | |
| 2013/0288130 A1 | 10/2013 | Sheem et al. | |
| 2015/0229005 A1* | 8/2015 | Han | H01M 10/0568 429/331 |
| 2015/0263336 A1* | 9/2015 | An | H01M 4/625 429/221 |
| 2016/0036044 A1 | 2/2016 | Ohara et al. | |
| 2016/0293923 A1* | 10/2016 | Kim | H01M 4/623 |
| 2016/0301076 A1 | 10/2016 | Shen et al. | |

FOREIGN PATENT DOCUMENTS

| | | | |
|---|---|---|---|
| CN | 104393262 A | 3/2015 | |
| CN | 104882612 A | 9/2015 | |
| CN | 105119016 A | 12/2015 | |
| CN | 105144437 A | 12/2015 | |
| CN | 105655644 A | 6/2016 | |
| KR | 10-2006-0082041 A | 7/2006 | |
| KR | 10-2011-0033640 A | 3/2011 | |
| KR | 10-2012-0021678 A | 3/2012 | |
| KR | 10-2012-0040430 A | 4/2012 | |
| KR | 10-2013-0122469 A | 11/2013 | |
| KR | 10-2014-0139356 A | 12/2014 | |
| KR | 10-2015-0031018 A | 3/2015 | |
| WO | WO 2015/076575 | * 5/2015 | H01M 4/133 |
| WO | WO 2015/076575 A1 | 5/2015 | |

OTHER PUBLICATIONS

Chinese Office action dated Jul. 6, 2021 issued in corresponding Application No. 201780064101.7 with English translation, 14 pages.

* cited by examiner

LITHIUM SECONDARY BATTERY

CROSS-REFERENCE TO RELATED APPLICATION(S)

This application is a National Phase Patent Application of International Patent Application Number PCT/KR2017/003688, filed on Apr. 4, 2017, which claims priority of Korean Patent Application No. 10-2016-0135148, filed Oct. 18, 2016. The entire contents of both of which are incorporated herein by reference.

TECHNICAL FIELD

A lithium secondary battery is disclosed.

BACKGROUND ART

In recent times, due to reductions in size and weight of portable electronic devices, and popularization of portable electronic devices, researches on lithium secondary batteries having high energy density for power source of portable electronic devices have been actively made.

The lithium secondary battery includes a negative electrode, a positive electrode, and an electrolyte, and generates electrical energy by oxidation and reduction reactions when lithium ions are intercalated/deintercalated into the positive and negative electrodes.

A negative electrode (anode) active material of such a lithium secondary battery includes a lithium metal, a carbon-based material, Si, and the like.

For a positive electrode active material of a lithium secondary battery, metal chalcogenide compounds capable of intercalating and deintercalating lithium ions, and for example, composite metal oxide such as $LiCoO_2$, $LiMn_2O_4$, $LiNiO_2$, $LiNi_{1-x}Co_xO_2$ (0<X<1), $LiMnO_2$, and the like, are used.

In order to use such a lithium secondary battery as an automobile battery, researches for obtaining high output characteristics of a lithium secondary battery have been conducted.

DETAILED DESCRIPTION OF THE INVENTION

Technical Problem

An embodiment of the present invention provides a lithium secondary battery having improved output characteristics.

Technical Solution

An embodiment of the present invention provides a lithium secondary battery including a negative electrode including a negative electrode active material layer including a soft carbon negative electrode active material and a byproduct having an average particle size (D50) of 10 nm to 70 nm; a positive electrode including a positive electrode active material; and an electrolyte.

An amount of the byproduct may be 3.3725 wt % to 3.7275 wt % based on the total 100 wt % of the negative electrode active material.

The byproduct may include C, F—P, and LiF.

The negative electrode active material layer may include 2.375 at % to 2.625 at % of LiF and 0.9975 at % to 1.1025 at % of F—P and C as a byproduct.

The positive electrode may further include activated carbon.

The lithium secondary battery may be subjected to an activating process, and the activating process may include a first aging process, first charging and discharging processes, a second aging process, second charging and discharging processes, a third aging process, and a fourth aging process, and the first aging process is performed in less than 1440 minutes.

The first aging process, the first charging and discharging processes, the second aging process, the second charging and discharging processes, and the third aging process may be performed for less than or equal to 2500 minutes.

The first charging and discharging processes may be performed by CC charging at 0.5 C to 2 C up to SOC 70% or CV and 1/20 C charging at 0.5 C to 2 C and discharging at 0.5 C to 2 C to a cut-off voltage of 2.0 V.

In addition, the second charging and discharging processes may be performed by charging and discharging CV and 0.01 A at 0.5 C to 2 C up to SOC 50%.

Advantageous Effects

The lithium secondary battery according to an embodiment of the present invention exhibits a small increase in resistance, and excellent output characteristics and excellent cycle-life characteristics.

MODE FOR INVENTION

Figure 1:
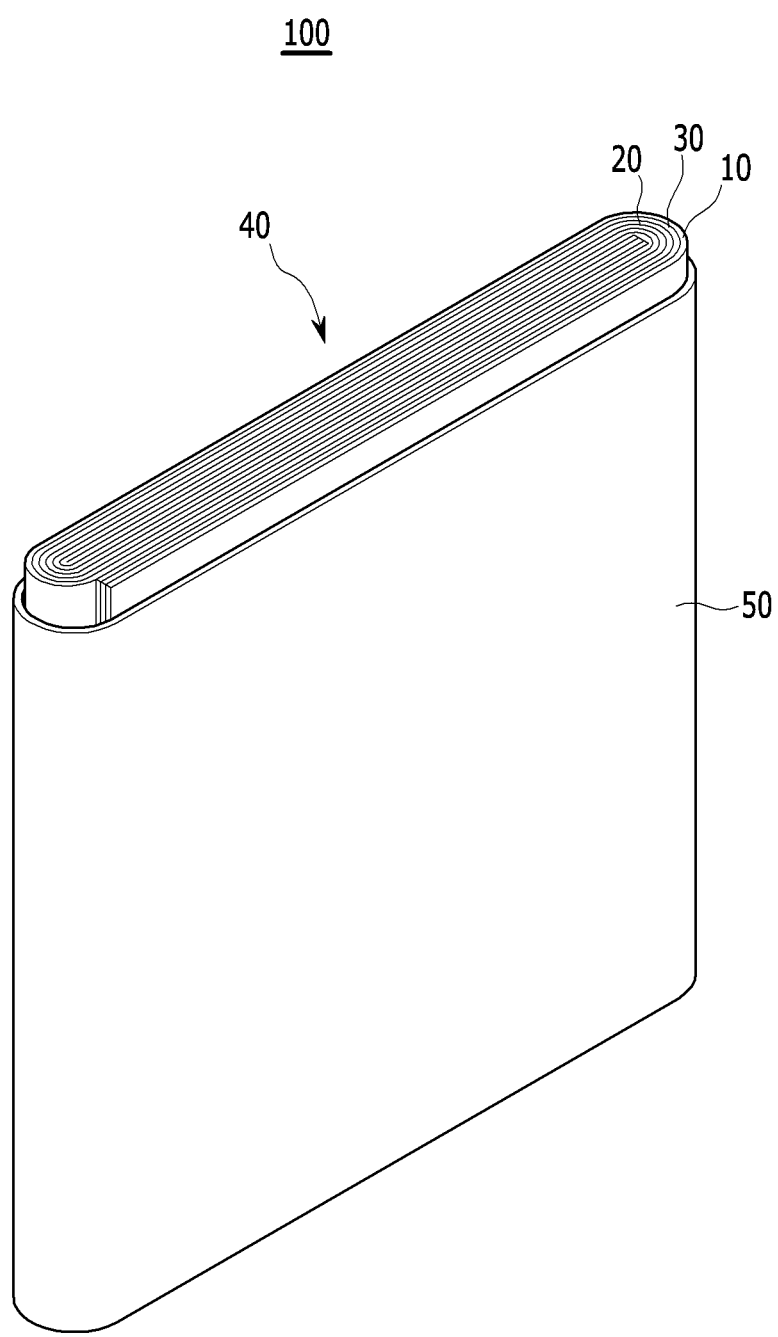
FIG. 1 is a schematic view showing a structure of a lithium secondary battery according to an embodiment of the present invention.

Hereinafter, embodiments of the present invention are described in detail. However, these embodiments are exemplary, the present invention is not limited thereto and the present invention is defined by the scope of claims.

A lithium secondary battery according to an embodiment of the present invention includes a negative electrode including a negative electrode active material layer including a soft carbon negative electrode active material and a byproduct; a positive electrode including a positive electrode active material; and an electrolyte.

An average particle diameter (D50) of the byproduct may be 10 nm to 70 nm. When the average particle size (D50) of the byproducts is in the nano-size range as described above, the output characteristics may be further improved.

In the present specification, when a definition is not otherwise provided, an average particle diameter (D50) indicates a diameter of a particle where an accumulated volume is about 50 volume % in a particle distribution.

The byproduct may include C, F—P, and LiF. According to an embodiment, the negative electrode active material layer may include 2.375 at % to 2.625 at % of LiF and 0.9975 at % to 1.1025 at % of F—P and C as byproducts. When the byproduct composition and amount of the negative electrode active material layer are described above, a battery may exhibit more appropriate cycle-life characteristics.

Like this, the lithium secondary battery including the byproduct having an average particle diameter (D50) of 10 nm to 70 nm as described above included in the negative electrode is a battery subjected to the activation process and particularly, the battery is subjected to the first aging process in less than 1440 minutes in the activation process. In an embodiment, the activating process may include a first aging process, first charging and discharging processes, a second aging process, second charging and discharging processes, a third aging process, and a fourth aging process.

The first aging process may be performed for less than 1440 minutes and appropriately, for greater than or equal to 480 minutes and less than 1440 minutes. In this way, when the first aging process is performed for less than 1440 minutes, a byproduct having an average particle size (D50) of 10 to 70 nm may be formed. When the first aging process is performed for a long time of greater than or equal to 1440 minutes, a byproduct having a large average particle diameter (D50) of about 0.15 μm to 0.2 μm is formed and thus may cause a problem of a capacity decrease and a resistance increase.

The byproduct having an average particle size (D50) of 10 nm to 70 nm is obtained, as the first aging process is performed for less than 1440 minutes, and this effect of improving output characteristics by forming the byproduct having the above small average particle size may be obtained, when soft carbon is used as a negative electrode active material. When crystalline carbon such as graphite is used as a negative electrode active material, or even when amorphous carbon is used, hard carbon, a mesophase pitch carbonized product, fired coke, and the like is used as a negative electrode active material, the effect of improving output characteristics may be not obtained, even though the first aging process is performed for less than 1440 minutes. The reason is that the soft carbon has an absorption reaction of lithium ions during the charge and discharge, but crystalline carbon and the amorphous carbon such as hard carbon, a mesophase pitch carbonized product, fired coke, and the like has an intercalation reaction of lithium ions.

In addition, the first aging process, the first charging and discharging processes, the second aging process, the second charging and discharging processes, and the third aging process may be performed for less than or equal to 2500 minutes. In other words, all the other steps except for the fourth aging process in the activating process may be performed for less than or equal to 2500 minutes. When the first aging process, the first charging and discharging processes, the second aging process, the second charging and discharging processes, and the third aging process are performed for less than or equal to 2500 minutes, entire time of the activating process may be shortened, and thus a battery mass production may be improved, and in addition, an output may be improved.

The aging process indicates a process of allowing the lithium secondary battery to stand at room temperature (about 20° C. to about 25° C.), which is widely known in the related art.

In the activating process, the first charging and discharging processes may be performed by CC charging at 0.5 C to 2 C up to SOC 70% (SOC (State of Charge) 70: charged state so that it reaches 70% charge capacity when a total charge capacity of a battery is 100%) or CV and 1/20 C charging 0.5 C to 2 C, and discharging at 0.5 C to 2 C to a cut-off voltage of 2.0 V. When the first charging and discharging process is performed under the condition, a byproduct may be formed to have a smaller size, and an amount of the byproduct may be effectively reduced, and accordingly, a capacity increase and a resistance decrease may be obtained.

In addition, the second charging and discharging processes may be performed by charging and discharging CV and 0.01 A at 0.5 C to 2 C up to SOC 50% (less than or equal to SOC50). When the second charging and discharging process is performed under the condition, a production time for manufacturing a battery may be effectively shortened, and in addition a defective battery may be effectively sorted out.

The negative electrode includes a current collector and a negative electrode active material layer including the soft carbon negative electrode active material disposed on the current collector.

The negative electrode active material layer may include a binder and optionally a conductive material. In the negative electrode active material layer, the negative electrode active material may be included in an amount of 95 wt % to 99 wt % based on a total weight of the negative electrode active material layer. In addition, an amount of the binder may be 1 wt % to 5 wt % based on a total amount of the negative electrode active material layer. When the conductive material is further included, 90 wt % to 98 wt % of a negative electrode active material, 1 wt % to 5 wt % of a binder, and 1 wt % to 5 wt % of a conductive material may be used.

The binder improves binding properties of negative electrode active material particles with one another and with a current collector. The binder may include a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, a polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity, any electrically conductive material may be used as a conductive material unless it causes a chemical change and examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The negative current collector may include one selected from the group consisting of a copper foil, a nickel foil, a stainless steel foil, a titanium foil, a nickel foam, a copper foam, a polymer substrate coated with a conductive metal, and a combination thereof.

The positive electrode may further include activated carbon. When the activated carbon is further included, the activated carbon may physically adsorb lithium ions and rapidly transfer the adsorbed lithium ions to the positive electrode active material, thereby improving high rate capability.

When the activated carbon is further included, a mixing ratio of the positive electrode active material and the activated carbon may be 97:3 wt % to 93:7 wt %. When the mixing ratio of the positive electrode active material and the activated carbon is within the range, more appropriate charge and discharge rate capability and capacity may be obtained.

The negative electrode may be manufactured by mixing an active material, a binder, and optionally a conductive material in a solvent to prepare an active material composition and coating the active material composition on a current collector. The solvent includes N-methylpyrrolidone and the like, but is not limited thereto. When the water-soluble binder is used in the negative electrode, a solvent used for preparing a negative electrode active material composition may be water.

The positive electrode includes a current collector and a positive electrode active material layer formed on the current collector. The positive electrode active material layer includes a positive electrode active material and optionally activated carbon. In addition, the positive electrode active material layer may further include a conductive material and a binder.

The positive electrode active material may include lithiated intercalation compounds that reversibly intercalate and deintercalate lithium ions. Specific examples may be one or more composite oxides of a metal selected from cobalt, manganese, nickel, and a combination thereof, and lithium.

For more specific examples, the compounds represented by one of chemical formulae may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.5$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 < \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$)

In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

In an embodiment, the positive electrode active material may be $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$).

In addition, the compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive electrode active material by using these elements in the compound and the method may include any coating method (e.g., spray coating, dipping, etc.), but is not illustrated in more detail since it is well-known to those skilled in the related field.

In the positive electrode active material layer, a sum amount of the positive electrode active material and the activated carbon may be 85 wt % to 98 wt % based on a total weight of the positive electrode active material layer. In the positive electrode active material layer, a mixture ratio of the positive electrode active material and the activated carbon may be 97:3 to 93:7 by weight within the range of 85 wt % to 98 wt % of the sum amount of the positive electrode active material and the activated carbon.

In addition, each amount of the binder and conductive material may be 1 wt % to 10 wt % based on a total weight of the positive electrode active material layer.

The binder improves binding properties of positive electrode active material particles with one another and with a current collector. Examples of the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, carbon fiber, and the like; a metal-based material of a metal powder or a metal fiber including copper, nickel, aluminum, silver, and the like; a conductive polymer such as a polyphenylene derivative; or a mixture thereof.

The current collector may use Al, but is not limited thereto.

The positive electrode may be manufactured by mixing a positive electrode active material, activated carbon, a conductive material, and a binder in a solvent to prepare an active material composition and coating the active material composition on a current collector. The solvent includes N-methylpyrrolidone and the like, but is not limited thereto.

The electrolyte includes an organic solvent and a lithium salt.

The organic solvent serves as a medium for transporting ions taking part in the electrochemical reaction of a battery and may be a non-aqueous organic solvent.

The organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like. The alcohol-based solvent may include ethanol, isopropyl alcohol, and the like, and the aprotic solvent may include nitriles such as R—CN (wherein R is a C2 to C20 linear, branched, or cyclic hydrocarbon group, a double bond, an aromatic ring, or an ether bond), and the like, amides such as dimethyl formamide, and the like, dioxolanes such as 1,3-dioxolane, and the like, sulfolanes, and the like.

The organic solvent may be used alone or in a mixture of one or more. When the organic solvent is used in a mixture, the mixture ratio may be controlled in accordance with a desirable battery performance.

The carbonate-based solvent may include a mixture of a cyclic carbonate and a linear (chain) carbonate. When the cyclic carbonate and linear carbonate are mixed together in a volume ratio of 1:1 to 1:9, electrolyte performance may be improved.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

[Chemical Formula 1]

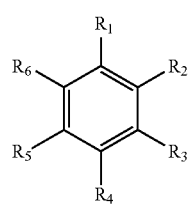

In Chemical Formula 1, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula 2 in order to improve cycle life of a battery as additive for improving cycle life.

[Chemical Formula 2]

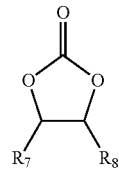

In Chemical Formula 2, $R_7$ and $R_8$ are the same or different and selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and fluorinated C1 to C5 alkyl group, and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate, and the like. The amount of the additive for improving cycle life may be used within an appropriate range.

The electrolyte may further include a borate-based compound as an additive in order to improve output characteristics. The borate-based compound is tris (trimethylsilyl) borate (TMSB) but is not limited. An amount of the borate-based compound may be adjusted appropriately.

The lithium salt is dissolved in an organic solvent, supplies a battery with lithium ions, basically operates the lithium secondary battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer ranging from 1 to 20, LiCl, LiI, and $LiB(C_2O_4)_2$ (lithium bis(oxalato) borate; LiBOB). The lithium salt may be used in a concentration ranging from 0.1 to 2.0 M. When the lithium salt is included at the above concentration range, an electrolyte may have excellent performance and lithium ion mobility due to optimal electrolyte conductivity and viscosity.

The separator may include for example, include polyethylene, polypropylene, polyvinylidene fluoride, and multilayers thereof such as a polyethylene/polypropylene double-layered separator, a polyethylene/polypropylene/polyethylene triple-layered separator, and a polypropylene/polyethylene/polypropylene triple-layered separator.

FIG. 1 is a schematic view showing a structure of a positive electrode active material according to an embodiment. Referring to FIG. 1, a lithium secondary battery 100 according to an embodiment may include an electrode assembly 40 manufactured by winding a separator 30 disposed between a positive electrode 10 and a negative electrode 20 and a case 50 housing the electrode assembly 40. An electrolyte (not shown) may be impregnated in the positive electrode 10, the negative electrode 20, and the separator 30.

MODE FOR PERFORMING INVENTION

Hereinafter, examples of the present invention and comparative examples are described. These examples, however, are not in any sense to be interpreted as limiting the scope of the invention.

Example 1

92 wt % of a soft carbon negative electrode active material, 5 wt % of denka black, and 3 wt % of a mixture of a styrene-butadiene rubber and carboxylmethyl cellulose (a weight ratio of 2:1) were mixed in a water solvent to prepare negative electrode active material slurry.

The negative electrode active material slurry was coated on a 10 μm-thick Cu foil and then, dried and compressed to manufacture a negative electrode.

85 wt % of $LiCoO_2$, 5 wt % of activated carbon, 4 wt % of denka black, and 6 wt % of polyvinylidene fluoride (trade name: solef 6020, manufacture: Solvay) were mixed in an N-methyl pyrrolidone solvent to prepare positive electrode active material slurry.

The positive electrode active material slurry was coated on a 15 μm-thick Al foil and then, dried and compressed to manufacture a positive electrode.

A separator was disposed between the negative and positive electrodes and then, wound therewith into a cylindrical shape to manufacture a jelly-roll. As for the separator, a 25 μm-thick three-layered film of polyethylene/polypropylene/polyethylene was used.

The jelly-roll was inserted in an 18650-sized battery case, and an electrolyte solution was injected thereto to manufacture a lithium secondary battery cell. The electrolyte solution was prepared by dissolving 1.15 M $LiPF_6$ in a mixed solution of ethylene carbonate, ethylmethyl carbonate, and dimethyl carbonate (a volume ratio of 2:4:4).

The manufactured lithium secondary battery cell was allowed to stand at room temperature of 20° C. for 480 minutes as a first aging process and then, CC charged and discharged at 1 C up to SOC 70% as a first charge and discharge charge. The first charged and discharged battery cell was allowed to stand at room temperature of 20° C. for 1440 minutes as a second aging process and then, second charged and discharged CV and 0.01 A at 1 C up to SOC 50%. Subsequently, the second charged and discharged battery cell was allowed to stand at room temperature of 20° C. for 480 minutes as a third aging process and then, allowed to stand at room temperature of 20° C. for 4320 minutes as a fourth aging process to manufacture a lithium secondary battery cell through an activating process.

The lithium secondary battery cell through the activating process was treated through a formation process at room temperature of 20° C. for 7200 minutes in order to be released in a market.

Comparative Example 1

92 wt % of a soft carbon negative electrode active material, 5 wt % of denka black, and 3 wt % of a mixture of a styrene-butadiene rubber and carboxylmethyl cellulose (a weight ratio of 2:1) were mixed in a water solvent to prepare negative electrode active material slurry.

The negative electrode active material slurry was coated on a 10 μm-thick Cu foil and then, dried and compressed to manufacture a negative electrode.

85 wt % of $LiCoO_2$, 5 wt % of activated carbon, 4 wt % of denka black, and 6 wt % of polyvinylidene fluoride (trade name: solef 6020, manufacture: Solvay) were mixed in an N-methyl pyrrolidone solvent to prepare positive electrode active material slurry.

The positive electrode active material slurry was coated on a 15 μm-thick Al foil and then, dried and compressed to manufacture a positive electrode.

A separator was interposed between the negative and positive electrodes and then, wound therewith into a cylindrical shape to manufacture a jelly-roll. As for the separator, a 25 μm-thick three-layered film of polyethylene/polypropylene/polyethylene was used.

The jelly-roll was inserted into a 18650-sized battery case, and an electrolyte solution was injected thereinto to manufacture a lithium secondary battery cell. The electrolyte solution was prepared by dissolving 1.15 M $LiPF_6$ in a mixed solution of ethylene carbonate, ethylmethyl carbonate, and dimethyl carbonate (a volume ratio of 2:4:4).

The lithium secondary battery cell was allowed to stand at room temperature of 20° C. for 1440 minutes as a first aging process and then, charged at 0.5 C and a cut-off voltage of 4.2 V and discharged at 1 C by cutting off to SOC 50% as a first charge and discharge. The first charged and discharged battery cell was allowed to stand at room temperature of 20° C. for 480 minutes as a second aging process. Subsequently, the second aged battery cell was allowed to stand at room temperature of 20° C. for 7200 minutes as a third aging process to manufacture a lithium secondary battery cell through an activating process.

The lithium secondary battery cell through the activating process was treated through a formation process at room temperature of 20° C. for 7200 minutes in order to be released in a market.

Comparative Example 2

92 wt % of an artificial graphite negative electrode active material, 5 wt % of denka black, and 3 wt % of a mixture of a styrene-butadiene rubber and carboxylmethyl cellulose (a weight ratio of 2:1) were mixed in a water solvent to prepare negative electrode active material slurry.

The negative electrode active material slurry was coated on a 10 μm-thick Cu foil and then, dried and compressed to manufacture a negative electrode.

85 wt % of $LiCoO_2$, 5 wt % of activated carbon, 4 wt % of denka black, and 6 wt % of polyvinylidene fluoride (trade name: solef 6020, manufacturer: Solvay) were mixed in an N-methyl pyrrolidone solvent to prepare positive electrode active material slurry.

The positive electrode active material slurry was coated on a 15 μm-thick Al foil and then, dried and compressed to manufacture a positive electrode.

A separator was interposed between the negative and positive electrodes and then, wound therewith into a cylindrical shape to manufacture a jelly-roll. As for the separator, a 25 μm-thick three-layered film of polyethylene/polypropylene/polyethylene was used.

The jelly-roll was inserted into a 18650-sized battery case, and an electrolyte solution was injected thereinto to manufacture a lithium secondary battery cell. The electrolyte solution was prepared by dissolving 1.15 M $LiPF_6$ in a mixed solution of ethylene carbonate, ethylmethyl carbonate, and dimethyl carbonate (a volume ratio of 2:4:4).

The manufactured lithium secondary battery cell was allowed to stand at room temperature of 20° C. for 400 minutes as a first aging process and then, charged at 1 C and a cut-off voltage of 4.2 V and discharged by cutting off to SOC 50% as a first charge and discharge. The first charged and discharged battery cell was allowed to stand at room temperature of 20° C. for 1440 minutes as a second aging process and then, charged at 0.5 C by cutting off to SOC 50% and discharged at 1 C and a cut-off voltage of 2 V as a second charge and discharge. Subsequently, the second charged and discharged battery cell was allowed to stand at room temperature of 20° C. for 480 minutes as a third aging process and subsequently, allowed to stand at room temperature of 20° C. for 4320 minutes as a fourth aging process to manufacture a lithium secondary battery cell through an activating process.

The lithium secondary battery through the activating process was treated through a formation process at room temperature of 20° C. for 7200 minutes in order to be released into a market.

Comparative Example 3

92 wt % of an artificial graphite negative electrode active material, 5 wt % of denka black, and 3 wt % of a mixture of a styrene-butadiene rubber and carboxylmethyl cellulose (a weight ratio of 2:1) were mixed in a water solvent to prepare negative electrode active material slurry.

The negative electrode active material slurry was coated on a 10 μm-thick Cu foil and then, dried and compressed to manufacture a negative electrode.

85 wt % of $LiCoO_2$, 5 wt % of activated carbon, 4 wt % of denka black, and 6 wt % of polyvinylidene fluoride (trade name: solef 6020, manufacturer: Solvay) were mixed in an N-methyl pyrrolidone solvent to prepare positive electrode active material slurry.

The positive electrode active material slurry was coated on a 15 μm-thick Al foil and then, dried and compressed to manufacture a positive electrode.

A separator was interposed between the negative and positive electrodes and then, wound therewith into a cylindrical shape to manufacture a jelly-roll. As for the separator, a 25 μm-thick three-layered film of polyethylene/polypropylene/polyethylene was used.

The jelly-roll was inserted into a 18650-sized battery case, and an electrolyte solution was injected thereinto to manufacture a lithium secondary battery cell. The electrolyte solution was prepared by dissolving 1.15 M $LiPF_6$ in a mixed solution of ethylene carbonate, ethylmethyl carbonate, and dimethyl carbonate (a volume ratio of 2:4:4).

The manufactured lithium secondary battery cell was allowed to stand at room temperature of 20° C. for 1440 minutes as a first aging process and then, charged at 0.5 C and a cut-off voltage of 4.2 V and discharged at 0.5 C by cutting off to SOC 50% as a first charge and discharge. The first charged and discharged battery cell was allowed to stand at room temperature of 20° C. for 480 minutes as a second aging process. Subsequently, the second aged battery cell was allowed to stand at room temperature of 20° C. for 7200 minutes as a third aging process to manufacture a lithium secondary battery cell through an activating process.

The lithium secondary battery cell through the activating process was treated through a formation process at room temperature of 20° C. for 7200 minutes in order to be released into a market.

Surface Photograph of Negative Electrode

Figure 2:
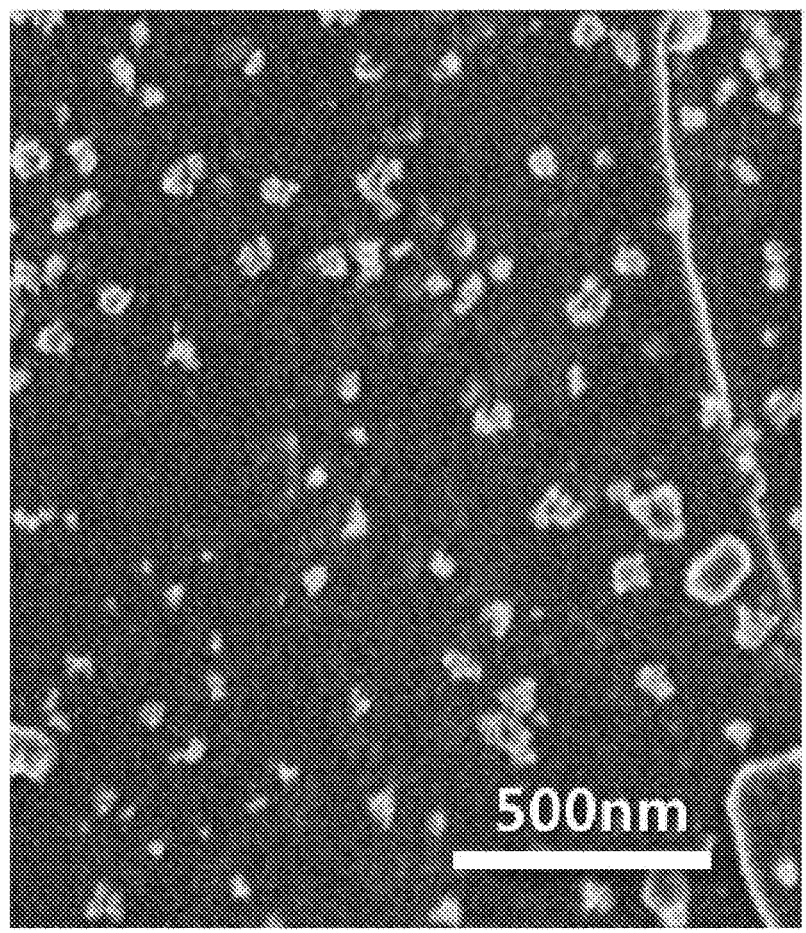
FIG. 2 is a photograph showing a surface of the negative electrode obtained by disassembling the lithium secondary battery cell according to Example 1.
Figure 3:
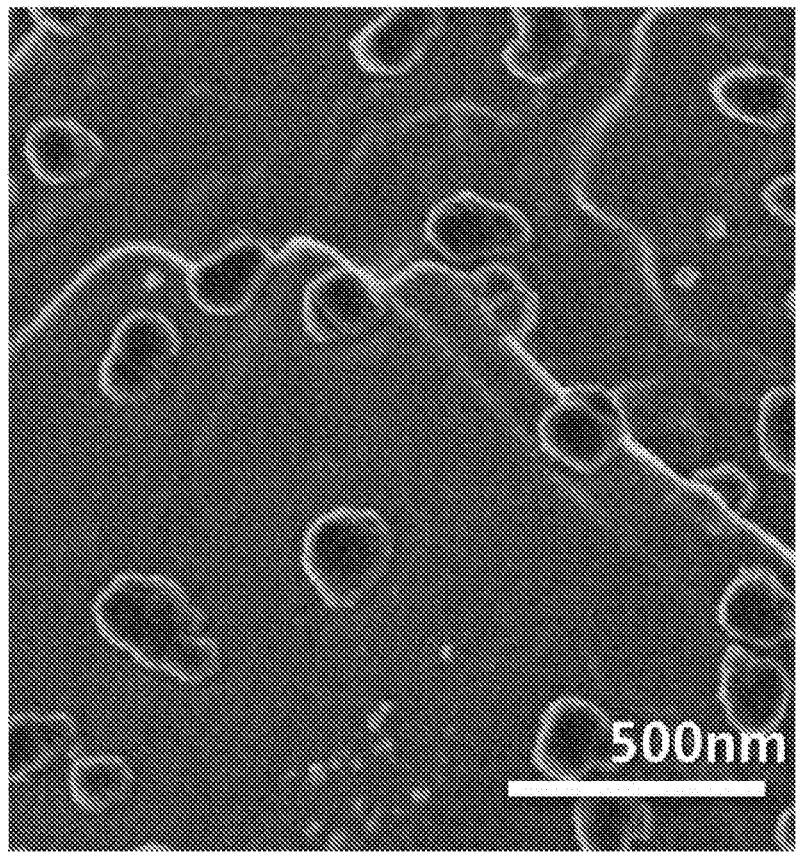
FIG. 3 is a photograph showing a surface of the negative electrode obtained by disassembling the lithium secondary battery cell according to Comparative Example 1.

The lithium secondary battery cells manufactured according to Example 1 and Comparative Example 1 and treated through the formation process were disassembled to take a photograph of each surface of the negative electrodes, which are respectively shown in FIGS. 2 and 3.

As shown in FIG. 2, a byproduct having an average particle diameter (D50) of about 70 nm was formed on the surface of the negative electrode treated through the activating process by performing the first aging process for 480 minutes according to Example 1. Herein, the byproduct turned out to include LiF, F—P, and C through XPS (X-ray Photo Electron Spectroscopy).

On the contrary, as shown in FIG. 3, a byproduct having an average particle diameter (D50) of about 160 nm was formed on the surface of the negative electrode treated through the activating process by performing the first aging process for 1440 minutes according to Comparative Example 1. Herein, the byproduct turned out to include LiF, F—P, and C through XPS (X-ray Photo Electron Spectroscopy).

Referring to the results of FIGS. 2 and 3, when the first aging process was performed for less than or equal to 480 minutes, the average particle diameter (D50) of the byproduct was decreased down to about 70 nm.

Figure 4:
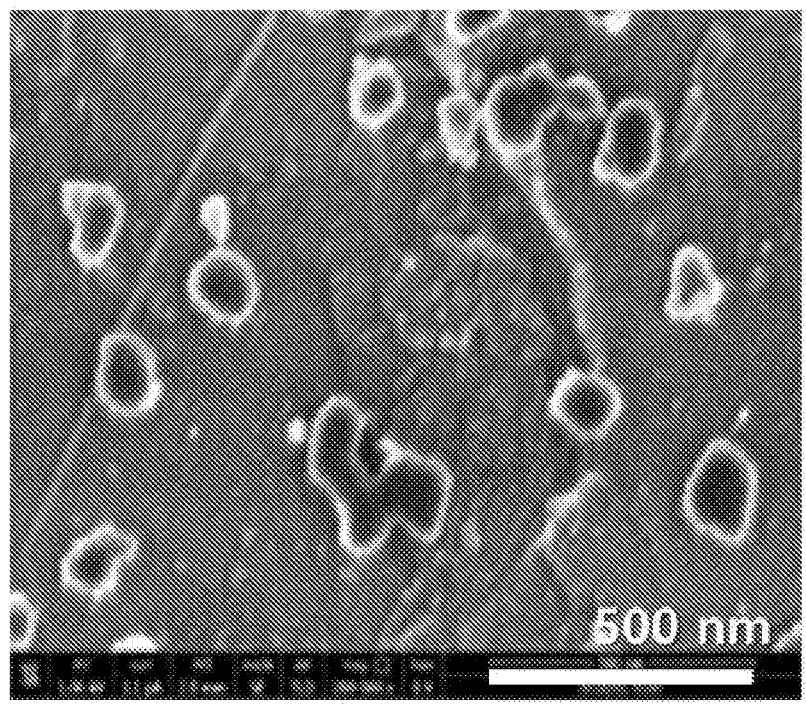
FIG. 4 is a photograph showing a surface of the negative electrode obtained by disassembling the lithium secondary battery cell according to Comparative Example 2.
Figure 5:
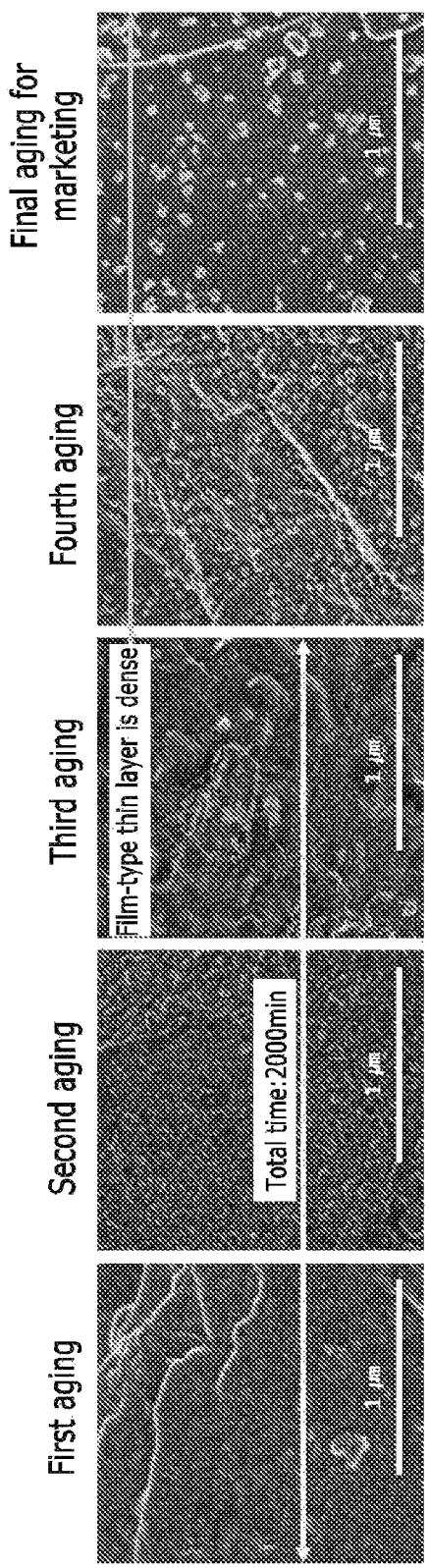
FIG. 5 is a photograph showing a surface of the negative electrode obtained by disassembling the lithium secondary battery cell obtained in each aging process of Example 1.

In addition, the lithium secondary battery cells according to Comparative Examples 2 and 3 were dissembled to take a photograph of each surface of the negative electrodes, which are respectively shown in FIGS. 4 and 5. As shown in FIG. 4, even though the first aging process was performed for a short time of 480 minutes, a byproduct having a large average particle diameter (D50) of 160 nm was formed in Comparative Example 2 using artificial graphite as a negative electrode active material like Comparative Example 3 performing a first aging process for 1440 minutes.

This result shows that when the negative electrode active material was not soft carbon, a first aging process had no large influence on an average particle diameter (D50) of a byproduct, even though a time of the first aging process was adjusted.

Surface Photograph of Negative Electrode in Each Activating Process Step

The surface photographs of the negative electrode obtained by dissembling the cell in each step after performing first aging, second aging, third aging, and fourth aging in the activating process of Example 1 and in addition, final aging for marketing were respectively shown in FIG. 5.

Figure 6:
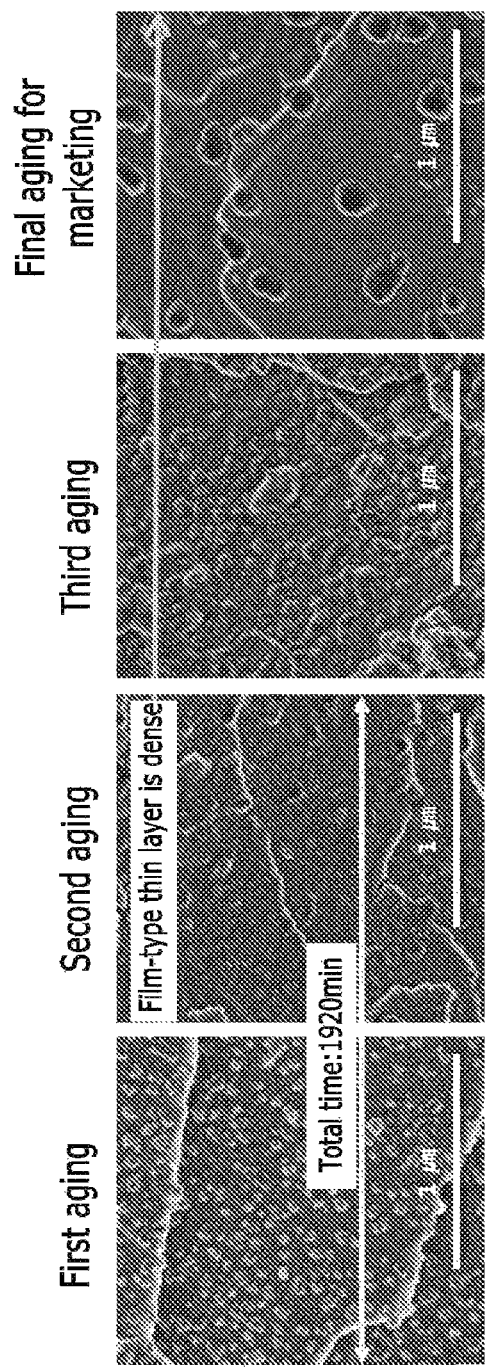
FIG. 6 is a photograph showing a surface of the negative electrode obtained by disassembling the lithium secondary battery cell obtained in each aging process of Comparative Example 1.

In addition, the surface photographs of the negative electrode obtained by dissembling the cell in each step after performing first aging, second aging, and third aging in the activating process of Comparative Example 1 and in addition, final aging for marketing were respectively shown in FIG. 6.

As shown in FIGS. 5 and 6, the surfaces of the negative electrodes according to Example 1 and Comparative Example 1 after the first aging and the second aging were greatly different, after the final aging for being released into a market, the byproducts on the surfaces of the negative electrodes had a different size.

Resistance Measurement

Figure 7:
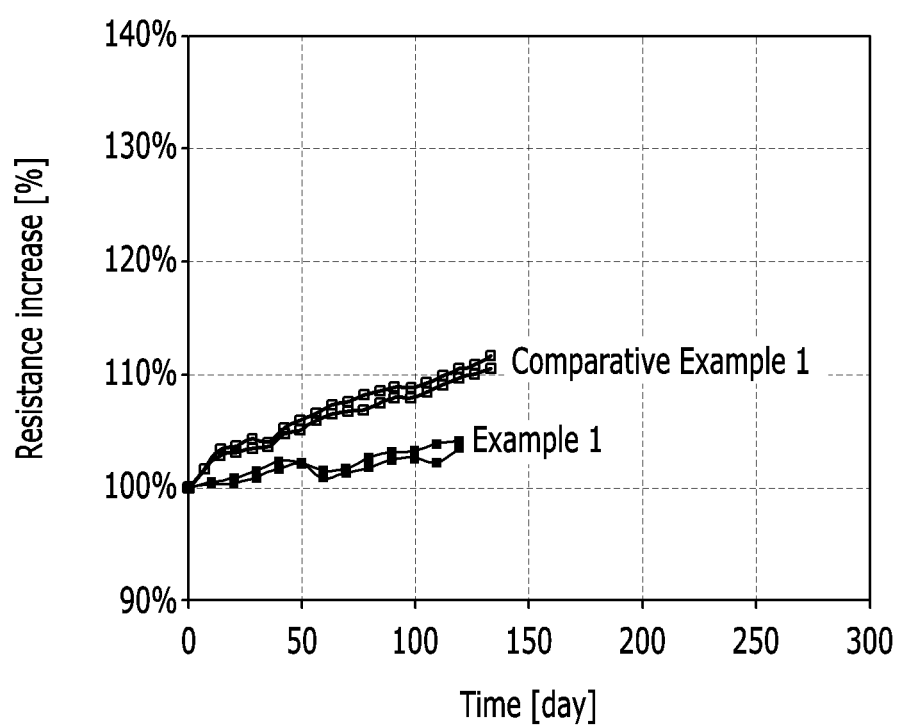
FIG. 7 is a graph showing resistance increases depending on storage times of the lithium secondary battery cells according to Example 1 and Comparative Example 1.

Resistances of the lithium secondary battery cells manufactured according to Example 1 and Comparative Example 1 and treated through the formation process were measured, and then, resistances thereof were measured again depending on storage times, while stored for 130 days. A ratio of the resistance depending on the storage time relative to the resistance before the storage was calculated, and the results are shown in FIG. 7. As shown in FIG. 7, Example 1 showed a smaller resistance increase than that of Comparative Example 1, and from this result, an improvement of output may be expected.

While the present invention has been particularly shown and described with reference to exemplary embodiments thereof, it is to be understood that the invention is not limited to the disclosed exemplary embodiments. On the contrary, it is intended to cover various modifications and equivalent arrangements included within the spirit and scope of the appended claims.

The invention claimed is:

1. A lithium secondary battery, comprising
a negative electrode comprising a negative electrode active material layer comprising a soft carbon negative electrode active material and a byproduct comprising C, F—P and LiF and having a particle size (D50) of 10 nm to 70 nm;
a positive electrode comprising a positive electrode active material; and
an electrolyte,
wherein the soft carbon negative electrode active material is in an amount of 90 wt % to 99 wt % based on a total weight of the negative electrode active material layer,
wherein the lithium secondary battery is subjected to an activating process configured to control the size, amount and chemical composition of the byproduct,
wherein the activating process comprises a first aging process, first charging and discharging processes, a second aging process, second charging and discharging processes, a third aging process, and a fourth aging process,
wherein the first aging process is performed in less than 1440 minutes, and
wherein the first charging and discharging processes are performed by CC charging at 0.5 C to 2 C up to SOC 70% and discharging at 0.5 C to 2 C to a cut-off voltage of 2.0 V.

2. The lithium secondary battery of claim 1, wherein the byproduct comprises 2.375 at % to 2.625 at % of LiF and 0.9975 at % to 1.1025 at % of F—P and C.

3. The lithium secondary battery of claim 1, wherein the positive electrode further comprises activated carbon.

4. The lithium secondary battery of claim 1, wherein the first aging process, the first charging and discharging processes, the second aging process, the second charging and discharging processes, and the third aging process are performed for less than or equal to 2500 minutes.

5. The lithium secondary battery of claim 1, wherein the second charging and discharging processes are performed by charging and discharging CV and 0.01 A at 0.5 C to 2 C up to SOC 50%.

6. The lithium secondary battery of claim 1, wherein an amount of the byproduct may be 3.3725 wt % to 3.7275 wt % based on the total 100 wt % of the negative electrode active material.

* * * * *